United States Patent [19]

Terumoto

[11] Patent Number: 4,626,178
[45] Date of Patent: Dec. 2, 1986

[54] FUEL SUPPLY PUMP

[75] Inventor: Susumu Terumoto, Katsuta, Japan

[73] Assignee: Hitachi, Ltd., Tokyo, Japan

[21] Appl. No.: 662,565

[22] Filed: Oct. 19, 1984

[30] Foreign Application Priority Data

Oct. 21, 1983 [JP] Japan .................................. 58-197281

[51] Int. Cl.⁴ .............................................. F04B 17/00
[52] U.S. Cl. ...................................... 417/366; 310/89;
310/154; 417/410
[58] Field of Search .................... 417/366, 410, 423 R;
310/89, 154, 42

[56] References Cited

U.S. PATENT DOCUMENTS

| | | | |
|---|---|---|---|
| 3,422,295 | 1/1969 | Parker | 310/154 |
| 3,936,243 | 2/1976 | Gakenholz | 417/366 |
| 4,212,601 | 7/1980 | Ina | 417/366 |
| 4,335,323 | 6/1982 | Kebbon et al. | 310/154 |
| 4,414,481 | 11/1983 | de Jong | 310/154 |
| 4,445,820 | 5/1984 | Hayashi et al. | 417/366 |
| 4,447,192 | 5/1984 | Tuckey | 417/410 |

FOREIGN PATENT DOCUMENTS 2404328  5/1979  France .................................. 310/89

Primary Examiner—Carlton R. Croyle
Assistant Examiner—Donald E. Stout
Attorney, Agent, or Firm—Antonelli, Terry & Wands

[57] ABSTRACT

A fuel supply pump so structured that an electric motor section and a pump section are housed in a tubular casing provided with a pipe for connection with an external hose, and an opening of the casing is enclosed by an end cover integrally provided with a connection pipe and a terminal. The electric motor section comprises a holder made of an insulating material and consisted of a pair of parts divided about its axis, an armature held at both ends of the holder through bearings, field magnets held on the respective holder plates, yokes arranged to cover the gaps between the paired parts, and brush units arranged to be inserted in the respective holder parts. The pump section comprises a rotor mounted to one end of the axis of shaft of the armature, and a pump-housing fixedly arranged to cover the rotor. Both the electric motor section and the pump section are both covered with the casing, and the opening of the casing is covered with the end cover, so that both the sections are assembled together.

7 Claims, 6 Drawing Figures

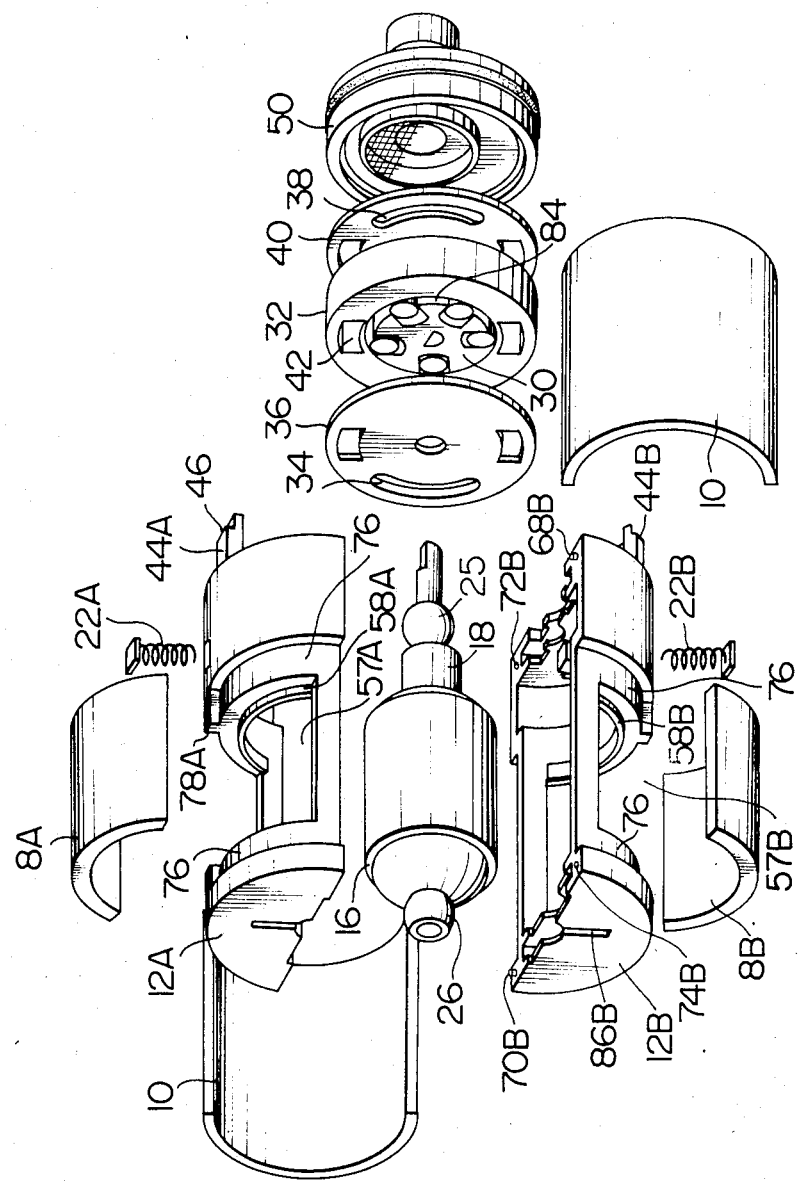

FUEL SUPPLY PUMP

BACKGROUND OF THE INVENTION

The present invention relates to a fuel supply pump, and, more particularly, to a fuel supply pump suitable for use as, for example, an electronic fuel injector for automobile engines.

In, for example, Japanese Laid Open Patent Application No. 55-35197 and Japaneses Utility Model No. 52-5209, a fuel supply pump is fixed in such a manner that a field magnet of an electric motor for driving the pump is secured in a cylindrical yoke by a spring or synthetic resin. However, the fuel supply pump thus structured is generally assembled such that its constitutional components, i.e., a brush, brush spring, brush holder for holding one bearing of an armature, armature, and a pump portion for holding the other bearing of the armature, are axially mounted one by one, thereby resulting in inefficient assembly operation.

A further disadvantage of the above fuel supply pumps resides in the fact that, due to manufacturing tolerances of the individual components such as, for example, the two bearing holding members, the yoke between both holding members, and the brush holder, there are fluctuations in a thrust amount of the armature as well as in a positional relationship between the respective components such as the yoke, magnet and brush.

It is an object of the present invention to provide a fuel supply pump which has the reduced number of components and which is superior in assembling efficiency.

To achieve the above object, in accordance with the present invention, a fuel supply pump is provided which includes an electric motor and a pump driven by the electric motor, with the electric motor and pump being housed in a cup-like casing having at one end thereof an opening and at the other end or the lateral side thereof a pipe for connection with an external hose. The opening is enclosed by an end cover integrally provided with the pipe for connection with said external hose and a terminal, said fuel supply pump includes an electric motor section comprising a holder, including a pair of insulating parts divided about its axis, an armature held at both ends of the holder through bearings, field magnets held on the holder parts; yokes arranged to cover the divided portions of the holder and brush units arranged to be inserted in the respective holder parts. A pump section of the fuel supply pump comprises a rotor mounted to one end of the armature shaft, and a pump-housing fixedly arranged to cover the rotor, the electric motor section and the pump section is covered with the cylindrical casing. The opening of the casing is covered with the end cover, so that both the electric motor section and the pump section are assembled together.

The above and other objects as well as novel features of this invention will be more apparent from the following detailed description with reference to the accompanying drawings.

BRIEF DESCRIPTION OF THE DRAWINGS

FIG. 2 is an exploded perspective view of a part of the fuel supply pump according to the present invention.

Figure 1:
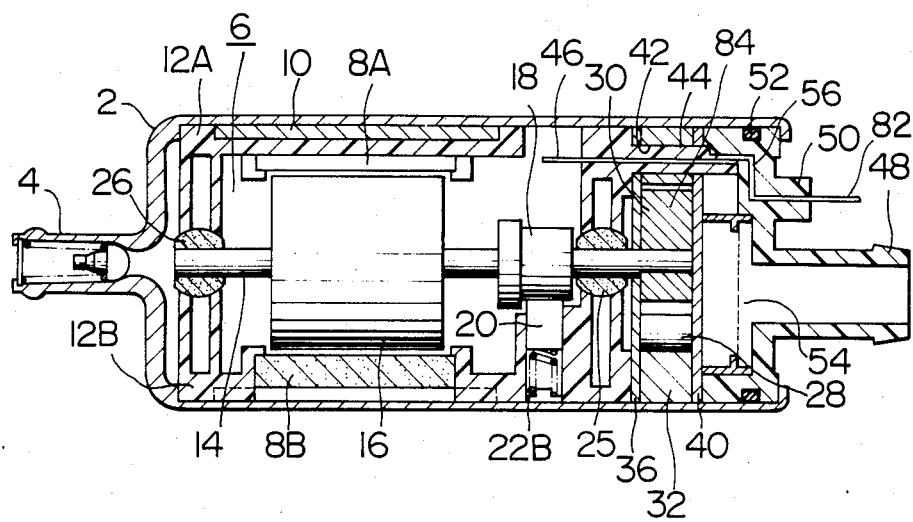
FIG. 1 is a sectional view showing one embodiment of a fuel supply pump according to the present invention.
Figure 3C:
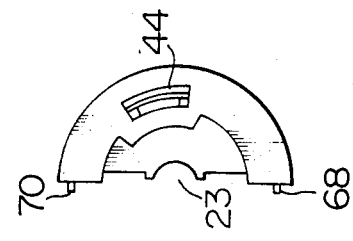
FIGS. 3A through 3D are detailed views of a holder used in the fuel pump according to the present invention.
Figure 3A:
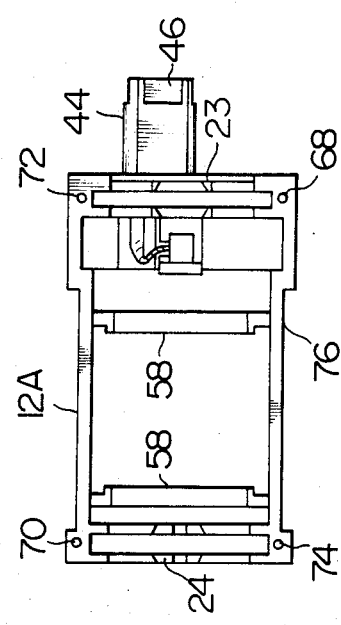
Figure 3D:
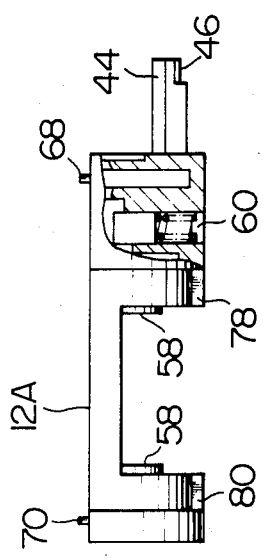
Figure 3B:
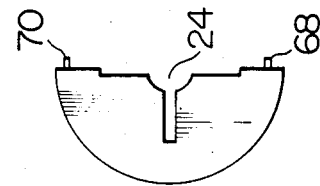

Referring now to the drawings, wherein like reference numerals are used throughout the various views to designate like parts and, more particularly, to FIG. 1, according to this figure, a fuel supply pump includes a cylindrical casing 2 formed by drawing a steel plate with the aid of a die, with the casing 2 having one end open and the other end to which a discharge pipe 4 is integrally attached at the central axis thereof. An electric motor section 6 is disposed in the casing 2 on a side of the discharge pipe 4, with the electric motor section being positioned against an inner circumferential wall surface of the casing 2, and supported by a holder generally designated by the reference numeral 12 for positioning magnets 8A, 8B and yokes 10, 10. More specifically, an armature 16 is provided which has a shaft 14 extending along a central axis of the casing 2, and a commutator 18 is arranged on the shaft 14 on the open side of the casing. A brush 20 is in contact with the commutator 18 and is pushed against the same by a brush spring 22A or 22B which is held on the holder 12.

The holder 12 is formed at both end faces thereof with circular apertures 23, 24 each serving as a bearing holding portion, and the shaft 14 is supported by the holder 12 through bearings 25, 26 respectively fitted in the apertures 23, 24.

On the opening side of the casing 2, a pump section 28 is disposed, with the pump section 28 being connected to one end of the shaft 14 and being operated upon driving of the armature 16. The pump section 28 includes a pump rotor 30 with the shaft 14 serving as the axis thereof. The pump rotor 30 is rotatably housed in a pump housing 32 arranged in abutment with the inner circumferential wall surface of the casing 2.

Furthermore, on a high-pressure side, a side plate 36, having a discharge port 34, is arranged on the armature side of the pump rotor 30 and the pump housing 32, and on a low-pressure side, a side plate 40, having an intake port 38, is arranged on the open end side of the casing 2, respectively.

The pump housing 32, the side plate 36 and the side plate 40 surrounding the pump rotor 30 are each formed with a pair of horizontal apertures 42, through which extend projections 44 integrally formed on the holder 12. Penetration of the projections 44 through the apertures 42 causes the pump-housing 32 to be securely held by the holder 12, so that a misalignment the pump-housing 32, due to an oscillation can be prevented. A lead wire 46, for supplying source power to the brush extends through each of the projections 44. At the opening of the casing 2, adjacent to the pump section 28, an end cover 50, made of synthetic resin and integrally provided with a suction pipe 48, is arranged through an O-ring 52, with the end cover 50 being fixed by caulking the end of the casing 2 to overlap the circumference of the former. The end cover 50 also includes a filter 54, located opposite to the suction pipe 48, so that a fluid from the suction pipe 48 passes through the filter 54. A power source lead wire 56 extends through the end cover 50 and, when the end cover 50 is fixed in the casing 2, the lead wire 56 contacts the lead wire 46.

In this connection, as shown most clearly in FIG. 2, the holder 12 is formed of synthetic resin as an insulating material, for example, nylon, and includes a pair of semicylindrical parts 12A and 12B divided about its axis.

As shown in FIG. 2, arcuate ribs 58A, 58B, each serving as a magnet holding portion, are formed in depressed protions 57A, 57B of the holder parts 12A, 12B, and magnets 8A, 8B are fitted to the arcuate ribs 58A, 58B to be respectively fixed in position. Further, in the circumference of the holder 12 with the magnets 8A, 8B being fixedly arranged, there are arranged yokes 10, 10 to cover the gaps between the magnets 8A and 8B, respectively.

The holder 12 supports, at both ends thereof, the bearings 25, 26 of the armature 16, and the holder parts 12A, 12B are formed with radial apertures 60A, 60B, in which are inserted brush springs 22A, 22B for pushing the brushes 20A, 20B against the commutators 18A, 18B, respectively.

As shown in FIGS. 3A to 3D, holder 12 is divided along a longitudinal axis thereof, into two parts and includes the magnet holding portions 58A, 58B, brush holding portions 60A, 60B and circular apertures 23, 24. On one diagonal line of a divided surface 66A of the part 12A, positioning protrusions 68A, 70A are provided, while recesses 72A, 74A are provided on the other diagonal line of the divided surface 66A which respectively accommodate protrusions 68B, 70B on the opposite part 12B. Depressed surfaces 76, serving as yoke holding portions receiving the yokes 10, fitted thereto are formed in the outer circumferential portions of the parts 12A, 12B, respectively, and spacer ribs 78A, 78B, 80A and 80B each having a short width are centrally provided on the depressed surfaces 76 in the circumferential direction. The respective end faces of the two-divided yokes 10 in the circumferential direction the spacer ribs 78A, 78B, 80A and 80B, so that the ribs function as partitions to hold the yokes in a separate state. Accordingly, the spacer ribs 78A, 78B, 80A, and 80B form magnetic spaces. In order to restrain an amount of the magnetic flux from the armature reaction that occurs upon rotation of the armature 16, it is preferable to a magnetic space. In this case, from since the portion of the yoke near the central portions of the respective magnets 8A, 8B in the circumferential direction does not act as a resistance, the main magnetic flux passes therethrough with the spacer ribs 78A, 78B, 80A and 80B are centrally provided on the magnet holding portions 58A, 58B in the circumferential direction.

Upon applying voltage to the terminal 82, the armature 16 is rotated and the pump rotor 30 having the shaft 14 of the armature as its own shaft is also rotated. Thus, fuel flows into a pump chamber 84 from the suction pipe 48 through the intake port 38 of the low-pressure side side plate 40, and then flows out of the pump chamber 84 through the discharge port 34 of the high-pressure side side plate 36. The fuel having left the pump chamber 84 passes around the bearing 25, gaps between the holder 12, and the armature 16 for the main part of the fuel, and then grooves 86 formed near the bearing 26, and finally flows out of the discharge pipe 4.

As shown in FIG. 2, first the armature 16, with the bearings 25, 26 assembled thereto, is placed on one holder part 12A and the other holder part 12B is then put thereon to hold the armature 16 between both parts. Thereafter, the magnet 8A, 8B are mounted to the magnet holding portions 58A, 58B of the holder 12, and the yokes 10, 10 are covered to surround the magnets 8A, 8B and the respective parts 12A, 12B so as to be tentatively fixed into the cylindrical form. Subsequently, brush springs 22A, 22B are assembled into the brush holding portions 60A, 60B, respectively, to complete the electric motor section 6. The pump section 28 may be stacked on the electric motor section. The end cover 50 is assembled to the pump section 28 and the electric motor section 6 thus stacked, and a casing 2 is fitted thereon to complete intermediate assembling. Finally, the casing 2 is caulked at the edge of its opening all over the circumference, thereby to obtain a complete product.

According to the foregoing embodiment, the number of components is reduced resulting in a very simple construction. Most of the components are sequentially assembled in the radial direction about the armature, thus resulting in the more improved assembling efficiency.

Further, adjustment of a thrust amount of the armature 16, which was required in the prior art, can be dispensed with, because two bearing holding poritons 23, 24 are formed integrally with the holder 12 to reduce the degree of fluctuations in distance between both bearings.

As will be apparent from the above description, a fuel supply pump according to the present invention makes it possible to reduce the number of constitutional components and to improve the assembling efficiency.

What is claimed is:

1. A fuel pump comprising an electric motor section and a pump section driven by said electric motor section, a tubular casing means for housing the motor section and the pump section, said tubular casing means includes an opening at a first end thereof and a first pipe means for connection with a first external hose at a second end of the tubular casing means, end cover means for enclosing said opening, said end cover means being integrally provided with a second pipe means for connection with a second external hose and a terminal, said electric motor section comprising an insulating holder having an outer circumferential portion with depressed surfaces and being divided along a longitudinal axis thereof into two parts, an armature supported at both ends of said insulating holder through bearings, field magnets mounted on the parts of said insulating holder, yoke means fitted to said depressed surfaces so as to be held by said insulating holder for covering gaps between the two parts of said insulating holder, and brush means insertable in respective parts of the insulating holder, said pump section comprising a rotor mounted to one end of the shaft of said armature, and a pump-housing fixedly arranged to cover said rotor, both said electric motor section and pump section being covered with said tubular casing means and the opening of said casing means is covered with said end cover means so that both said electric motor section and said pump section are assembled together.

2. A fuel supply pump according to claim 1, wherein said holder is formed in both end faces thereof with circular apertures, and said armature is held by said holder in such a manner that the shaft of the armature is supported by bearings fitted to said circular apertures.

3. A fuel supply pump according to claim 1, wherein each of said two parts of the holder have arcuate ribs, and said magnets are fitted to corresponding arcuate ribs so as to be held by said holder.

4. A fuel supply pump according to claim 1, wherein each of said parts of said holder are provided centrally on said depressed surfaces formed in the outer circumferential portion thereof in the circumferential direction with spacer ribs each having a short width, and said two-divided yokes are positioned by said spacer ribs to cover the gaps between said two parts of the holder.

5. A fuel supply pump according to claim 1, wherein each of said parts of said holder have a radial aperture, and each of said brush units is insertable in said radial aperture.

6. A fuel supply pump according to claim 1, wherein each of said parts of said holder have a divided surface, protrusions are provided on one diagonal line of the divided surface of the parts, and recesses fitting to protrusions provided on the opposite holder part are formed in the divided surface on the other diagonal line thereof.

7. A fuel supply pump according to claim 1, wherein said pump-housing is formed with horizontal apertures, each of said parts of the holder is provided at one end thereof with an integrally formed projection, and said projection is adapted to penetrate said horizontal aperture.

* * * * *